US011030183B2

(12) United States Patent
Brewster et al.

(10) Patent No.: US 11,030,183 B2
(45) Date of Patent: Jun. 8, 2021

(54) AUTOMATIC CONTENT-BASED APPEND DETECTION

(71) Applicant: DR HoldCo 2, Inc., Boston, MA (US)

(72) Inventors: Dave Brewster, Redwood City, CA (US); Victor Tze-Yeuan Tso, Redwood, CA (US); Ashley Ping Jin, Redwood, CA (US); Quan Chuong Ta, Redwood, CA (US); Lakshman Roy Sankar, Redwood, CA (US); Whitman Kwok, Redwood, CA (US)

(73) Assignee: DR HoldCo 2, Inc., Boston, MA (US)

( * ) Notice: Subject to any disclaimer, the term of this patent is extended or adjusted under 35 U.S.C. 154(b) by 265 days.

(21) Appl. No.: 15/264,377

(22) Filed: Sep. 13, 2016

(65) Prior Publication Data

US 2017/0262491 A1    Sep. 14, 2017

Related U.S. Application Data

(60) Provisional application No. 62/308,133, filed on Mar. 14, 2016.

(51) Int. Cl.
*G06F 16/00* (2019.01)
*G06F 16/23* (2019.01)
*G06F 16/22* (2019.01)

(52) U.S. Cl.
CPC ........ *G06F 16/2365* (2019.01); *G06F 16/221* (2019.01)

(58) Field of Classification Search
CPC ......... G06F 17/30371; G06F 17/30286; G06F 17/30067; G06F 17/30008;
(Continued)

(56) References Cited

U.S. PATENT DOCUMENTS

2005/0240615 A1* 10/2005 Barsness ............... G06F 16/221
2011/0113073 A1* 5/2011 Chang ................... G06F 16/20
707/803
(Continued)

OTHER PUBLICATIONS

Christopher Scaffidi, "Unsupervised Inference of Data Formats in Human-Readable Notation", Institute for Software Research, School of Computer Science, Carnegie Mellon University, 2007. cited on IDS Nov. 18, 2016.*
(Continued)

*Primary Examiner* — Ashish Thomas
*Assistant Examiner* — Suman Rajaputra
(74) *Attorney, Agent, or Firm* — Goodwin Procter LLP

(57) ABSTRACT

Automatic append includes: identifying, based at least in part on contents of a first data set comprising a first plurality of columns and contents of a second data set comprising a second plurality of columns, a plurality of matching columns and a plurality of non-matching columns. The matching columns comprise one or more columns among the first plurality of columns; and corresponding one or more matching columns among the second plurality of columns. The non-matching columns comprise: one or more columns among the first plurality of columns that do not match with any columns among the second plurality of columns; and one or more columns among the second plurality of columns that do not match with any columns among the first plurality of columns. Automatic append further includes obtaining a user specification of a first one or more non-matching columns to be appended to a second one or more non-matching columns, the first one or more non-matching columns and the second one or more non-matching columns being selected among the plurality of non-matching columns; and appending the first data set and the second data set according to at least the identified plurality of matching columns and the user specification.

33 Claims, 13 Drawing Sheets

(58) Field of Classification Search
CPC ........... G06F 17/30595; G06F 11/0751; G06F 16/2365; G06F 16/221
See application file for complete search history.

(56) References Cited

U.S. PATENT DOCUMENTS

| | | | | |
|---|---|---|---|---|
| 2011/0255782 A1* | 10/2011 | Welling | .................... | G06K 9/48 382/173 |
| 2012/0179712 A1* | 7/2012 | Bestgen | ............ | G06F 17/30324 707/769 |
| 2015/0032609 A1* | 1/2015 | Abuelsaad | ............ | G06F 16/215 705/40 |
| 2016/0012061 A1* | 1/2016 | Sperling | ............. | G06F 16/3347 707/754 |
| 2016/0055205 A1* | 2/2016 | Jonathan | ........... | G06F 16/24537 707/714 |
| 2016/0070731 A1* | 3/2016 | Chang | ............... | G06F 17/30598 707/741 |

OTHER PUBLICATIONS

Christopher Scaffidi, "Unsupervised Inference of Data Formats in Human-Readable Notation", Institute for Software Research, School of Computer Science, Carnegie Mellon University, 2007.

* cited by examiner

| Name | Address | Order Number | Phone Number | Email | Product ID | Total | Account Number | Transaction Type |
|---|---|---|---|---|---|---|---|---|
| Alice Smith | 123 Main St., Sacramento, CA 94203 | U3428865 | 352-555-1654 | asmith@gmail.com | 889574 | 14.99 | A980 | Weekly |
| Bob Wilson | 3 Maple Ave., Santa Fe, NM 87501 | E9802254 | 965-555-7845 | mailbob@yahoo.com | 675667 | 19.87 | A232 | Monthly |
| Charlie Jones | 89 Central St., CO 80123 | E9655621 | 577-555-8984 | Cj1970@cu.edu | 877831 | 157.21 | A33 | One-time |
| ... | ... | ... | ... | ... | ... | ... | ... | ... |

Table 1

| Customer | Item Number | Transaction ID | Home | Employer | Phone Number | Email Address | Amount | Date |
|---|---|---|---|---|---|---|---|---|
| Lisa Johnson | 546545 | U0324582 | 232 Hillview, Salem, OR 97301 | Mega Corp. | 898-555-7165 | lisa.J at gmail dot com | 20.00 | 1/20/2015 |
| Brian Miller | 965831 | D8643997 | Apt. B, 21 Creekside, San Francisco, CA 98682 | N/A | 910-555-9777 | brian at miller dot org | 498.85 | 1/31/2015 |
| ... | ... | ... | ... | ... | ... | ... | ... | ... |

Table 2

FIG. 1

| Account Number | Transaction Type | Account Type | Total |
|---|---|---|---|
| 45674 | debit | checking | 19 |
| 47879 | debit | savings | 25 |
| 49789 | credit | checking | 34 |

Table 1

| A/C # | Ledger Type | Account Type | Amount |
|---|---|---|---|
| 57897 | debit | checking | 112 |
| 58879 | credit | savings | 113 |
| 59912 | credit | savings | 114 |

Table 2

FIG. 7

| Table 1 -> Account Number; Table 2 -> A/C # | Table 1 -> Transaction Type; Table 2 -> Ledger Type | Table 1 -> Account Type; Table 2 -> Account Type | Table 1 -> Total; Table 2 -> Amount |
|---|---|---|---|
| 45674 | debit | checking | 19 |
| 47879 | debit | savings | 25 |
| 49789 | credit | checking | 34 |
| 57897 | debit | checking | 112 |
| 58879 | credit | savings | 113 |
| 59912 | credit | savings | 114 |

FIG. 9

|  | 0<br>NUL | 1<br>SOH |  | 98<br>b |  | 101<br>e |  | 127<br>DEL |
|---|---|---|---|---|---|---|---|---|
| 0<br>NUL |  |  | ... |  | ... |  | ... |  |
| 1<br>SOH |  |  |  |  |  |  |  |  |
| ⋮ |  |  |  |  |  |  |  |  |
| 100<br>d |  |  |  |  |  | 1 |  |  |
| 101<br>e |  |  |  | 1 |  |  |  |  |
| ⋮ |  |  |  |  |  |  |  |  |
| 127<br>DEL |  |  |  |  |  |  |  |  |

FIG. 11

|  | 0<br>NUL<br>SOH<br>STX | 1<br>ETX<br>EOT<br>ENQ | 32<br>'<br>a<br>b | 33<br>c<br>d<br>e | 41<br>{<br>\|<br>} | 42<br>~<br>DEL |
|---|---|---|---|---|---|---|
| 0<br>NUL SOH STX |  |  | ... |  | ... |  |
| 1<br>ETX EOT ENQ |  |  |  |  |  |  |
| ⋮ |  |  |  |  |  |  |
| 32<br>' a b |  |  |  | 1 |  |  |
| 33<br>c d e |  |  | 1 |  |  |  |
| ⋮ |  |  |  |  |  |  |
| 42<br>~ DEL |  |  |  |  |  |  |

FIG. 12

AUTOMATIC CONTENT-BASED APPEND DETECTION

This application claims priority to U.S. Provisional Patent Application No. 62/308,133 entitled AUTOMATIC CONTENT-BASED APPEND DETECTION filed Mar. 14, 2016 which is incorporated herein by reference for all purposes.

BACKGROUND OF THE INVENTION

Data preparation often requires two tables of data to be appended. To perform an append using an existing language or application that supports append, such as Structured Query Language (SQL) or Microsoft Excel®, a user is typically required to manually specify the columns from two tables to be appended. FIG. 1 is a diagram illustrating two example tables that are appended. In this example, the user would specify that the "Phone Number" column of Table 1 is to be appended to the "Phone Number" column of Table 2, and the "Email" column of Table 1 is to be appended to the "Email Address" column of Table 2. The "Order Number" column of Table 1 is not appended to anything, nor is the "Transaction ID" column of Table 2. Thus, the resulting appended table will have certain columns that include only cells from Table 1 and certain columns that include only cells from Table 2.

The specification of which columns are appended usually requires the user to have certain knowledge about the tables (e.g., that both tables have phone number-related columns and email-related columns). In practice, the user often does not have prior knowledge about the tables, therefore may not know which columns can be appended. For example, the user may have obtained the tables from disparate sources that assigned different names to columns pertaining to the same data, and thus may not have prior knowledge about which columns refer to the same data. Moreover, in some applications, the sizes of the data tables can be large (for example, data tables for large scale web applications can have hundreds of columns and millions of rows), making it difficult for the user to manually inspect the columns and determine which columns should be appended.

BRIEF DESCRIPTION OF THE DRAWINGS

Various embodiments of the invention are disclosed in the following detailed description and the accompanying drawings.

FIG. 1 is a diagram illustrating two example tables that are appended.

FIG. 7 illustrates two example tables that are to be appended.

FIG. 9 illustrates an example result of an append operation using the tables of FIG. 7.

FIG. 11 is a diagram illustrating an example matrix.

FIG. 12 is a diagram illustrating an example of a compressed matrix.

DETAILED DESCRIPTION

Figure 2:
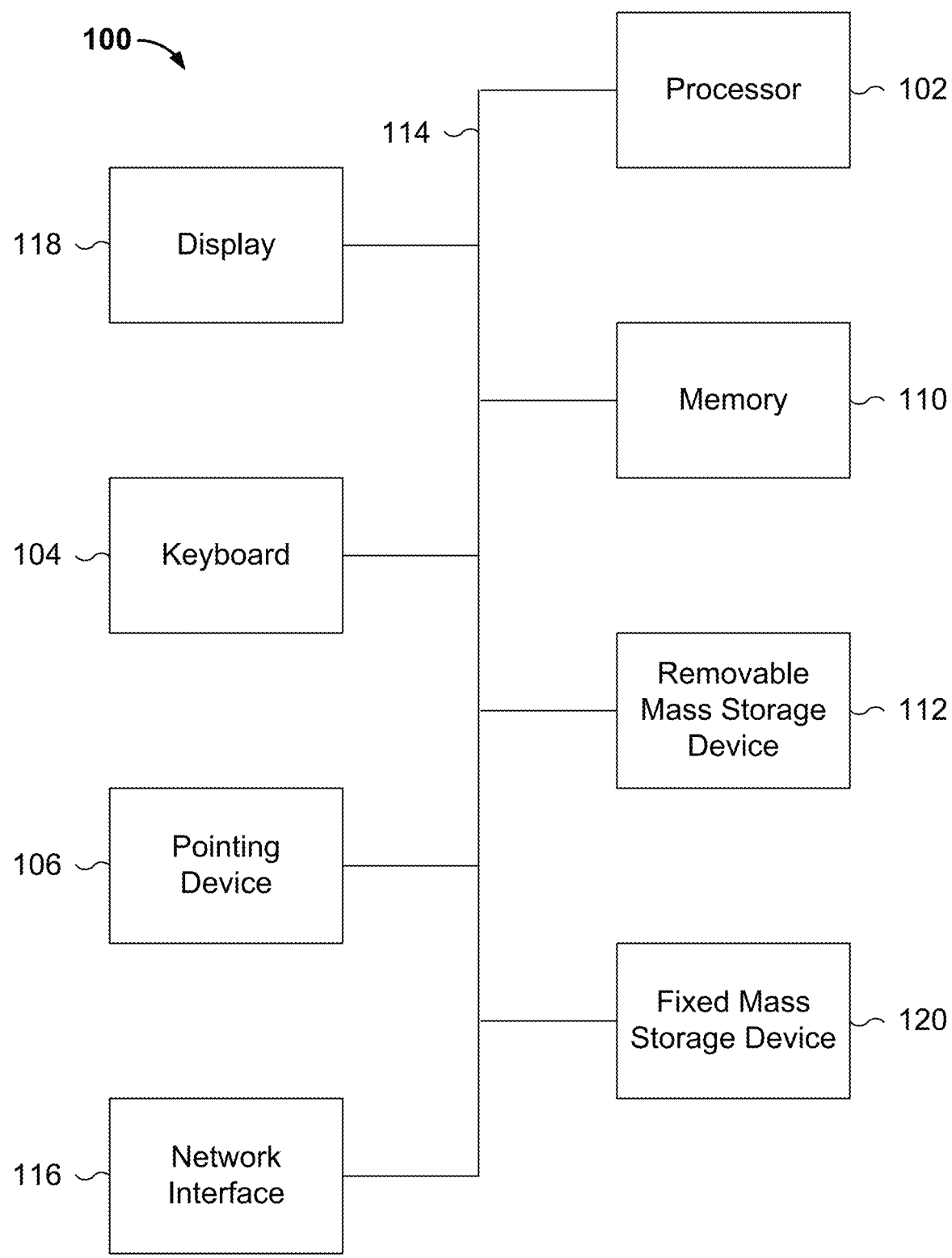
FIG. 2 is a functional diagram illustrating a programmed computer system for content-based append detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automated append detection based on data contents is described. As used herein, an append operation (also referred to as an append) adds specific columns of one data set after specific columns of another data set to form a resulting data set. In some embodiments, based at least in part on contents of a first data set comprising a first plurality of columns and contents of a second data set comprising a second plurality of columns, a plurality of matching columns and a plurality of non-matching columns are identified. A user specification of a first one or more non-matching columns to be appended to a second one or more non-matching columns is obtained, where the first one or more non-matching columns and the second one or more non-matching columns are selected among the plurality of non-matching columns. The user specification can also indicate a change to the identified matching columns. The first data set and the second data set are appended according to at least the identified plurality of matching columns and the user specification to generate a resulting data set.

FIG. 2 is a functional diagram illustrating a programmed computer system for content-based append detection in accordance with some embodiments. As will be apparent, other computer system architectures and configurations can be used to perform append detection. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide elements 300 and 310 described below with respect to FIG. 3 and/or executes/performs the processes described below with respect to FIGS. 4-5.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 3:
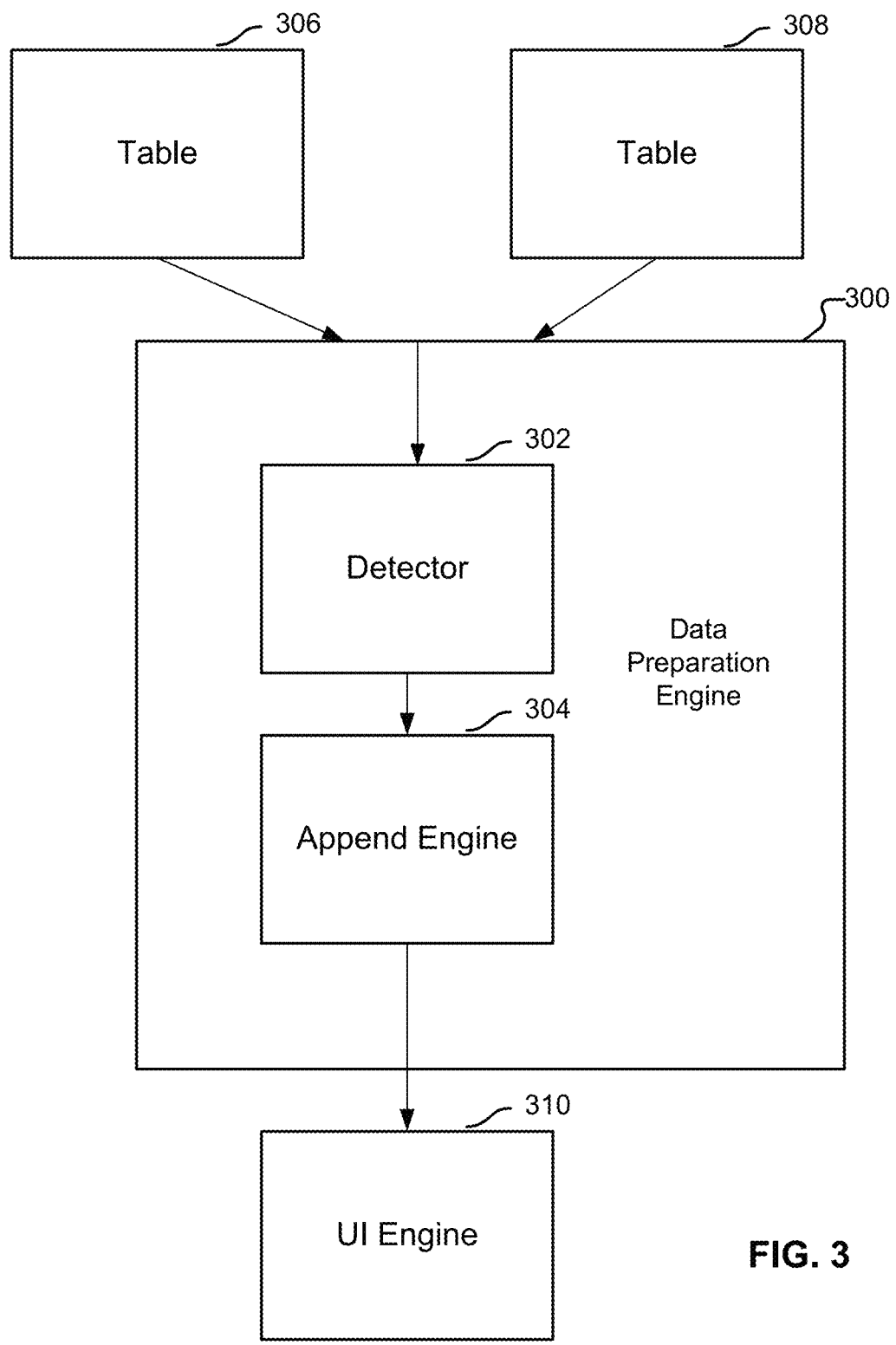
FIG. 3 is a system diagram illustrating an embodiment of a system for performing automated append detection.

FIG. 3 is a system diagram illustrating an embodiment of a system for performing automated append detection. In this example, a data preparation engine 300 is configured to access data sets 306 and 308 which are to be appended. Data preparation engine 300 can be implemented on one or more servers in a network-based/cloud-based environment, a client device (e.g., a computer, a smartphone, a wearable device, or other appropriate device with communication capabilities), or a combination. In the examples below, for purposes of discussion, data sets 306 and 308 are shown to include tables of data records (also referred to as cells or entries) organized in rows and columns. The data sets may be implemented to include tables storing the data in a data format of rows and columns, as well as in other data formats (e.g., list format, compressed data stream format, etc.) that can be interpreted/translated into a logical organization of tables. A data set can be stored in a memory (e.g., a random access memory), read or streamed from a storage (e.g., a local disk, a network storage, a distributed storage server, etc.), or obtained from any other appropriate sources.

The data preparation engine can be implemented using a system such as 100, and includes a detector 302 configured to detect which columns from data sets 306 and 308 should be appended and an append engine 304 configured to perform the append operation according to the detected results. Detector 302 and append engine 304 can be implemented using a variety of techniques, including as software comprising computer-executable instructions operating on one or more processors included in one or more computing devices, as firmware comprising special instructions such as microcode operating on programmable logic devices, as hardware such as Application Specific Integrated Circuits (ASICs), or a combination thereof. The operations of the detector and the append engine are described in greater detail below.

A user interface (UI) engine 310 provides UI components (e.g., UI screens, visual/audio displays, etc.) for the user to interact with the data preparation engine and perform functions such as obtaining the data sets, selecting columns to be appended, selecting configuration options, and obtaining append results and any other appropriate information. In various embodiments, user interface engine 310 can be implemented as a standalone application and/or a browser-based client application executing on a client device and communicating with the data preparation engine, as a part of the data preparation engine that transmits data to and receives data from a client application, or as a combination.

Figure 4:
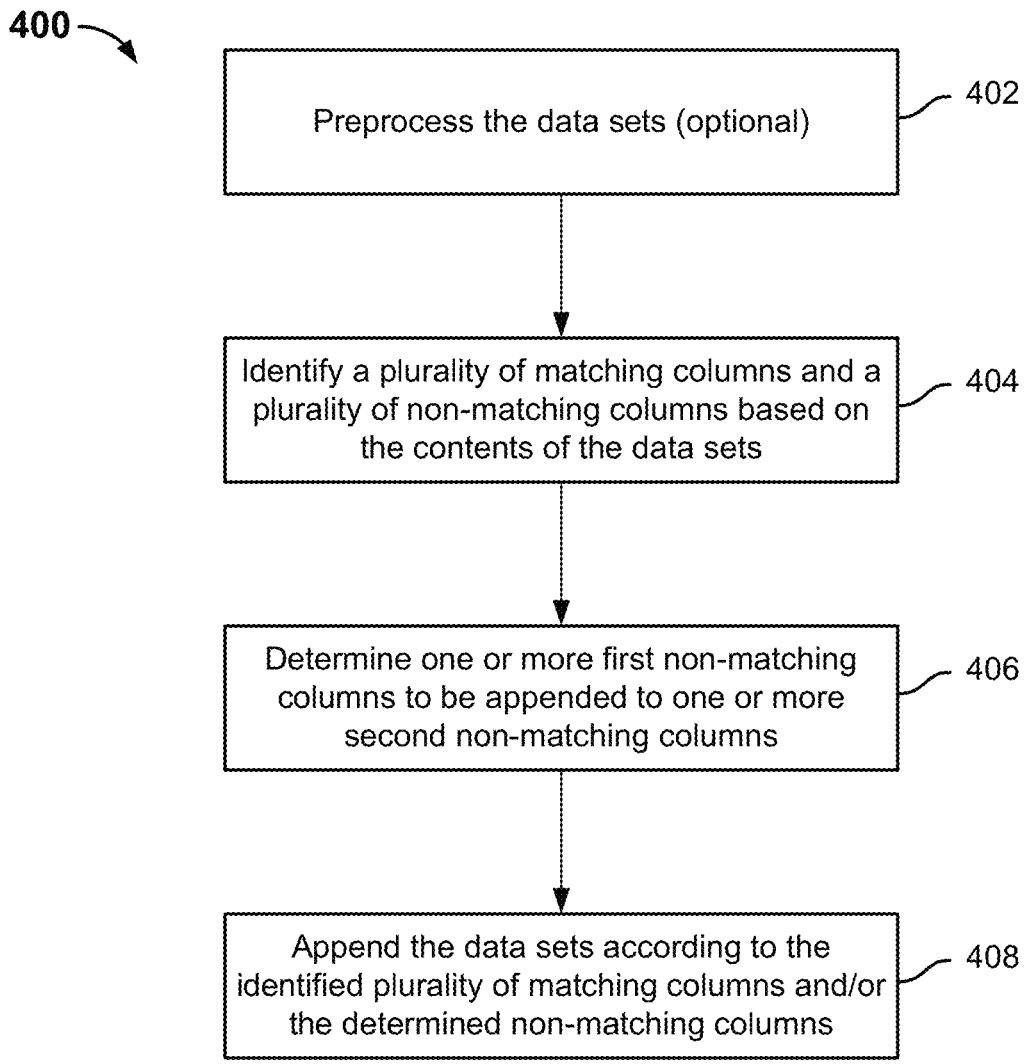
FIG. 4 is a flowchart illustrating an embodiment of a process for performing automated append detection.

FIG. 4 is a flowchart illustrating an embodiment of a process for performing automated append detection. Process 400 can be performed on a system such as 100.

In this example, a first data set and a second data set (e.g., 306 and 308 of FIG. 3) are selected by a user to be appended.

At 402, the data sets are optionally preprocessed. The preprocessing allows data set entries that are not identical to be matched (referred to as fuzzy match or inexact match), and in some cases reduces the amount of computation required for later comparisons. A variety of preprocessing techniques are used in various embodiments. For example, white spaces and/or special characters such as punctuations can be removed, certain special characters such as punctuations can be converted to other characters such as spaces, uppercase characters are converted to lower case characters (or vice versa), a spell check is performed, etc. In some embodiments, the specific preprocessing techniques being performed are configurable.

At 404, matching columns and non-matching columns are identified based at least in part on the contents of the first data set and the contents of the second data set. The matching columns include one or more columns from the first data set and one or more columns from the second data set that are found to have matching content (e.g., have the same or similar data pattern, have the same or similar title, etc.). The non-matching columns include one or more columns from the first data set and one or more columns from the second data set. Each non-matching column is found to not have a corresponding column with matching content in the other data set, but some of the non-matching columns can potentially be appended. As will be described in greater detail below, for the matching columns, it is deemed sufficiently likely that they can be appended and that append operations for these columns can be automatically carried out without the user's intervention. Thus, the matching columns are also referred to as definitive appends. For the non-matching columns, it is possible for some of them to be appended with other non-matching columns, but further user verification is needed before the append operation is carried out for these columns. Thus, the non-matching columns are also referred to as candidate appends. In some embodiments, the identification of matching and non-matching columns is based at least in part on the contents of the tables. In other words, the values of the columns in the tables are considered during the identification process. Details of the identification process are described below in connection with FIGS. 5 and 6 below.

At 406, a determination of a first set of one or more non-matching columns to be appended to a second set of one or more non-matching columns is obtained. In this example, the determination is made based on a user specification. In some embodiments, the user specification can also specify any changes to the matching columns (e.g., because the user has detected a wrong pairing or decided to make a change to the pairings). In some embodiments, the non-matching columns are presented to the user via a user interface screen and the user makes a selection among the non-matching columns. In some cases, because multiple ways to perform append operations on the non-matching columns are possible, the user is given the option to select among the non-matching columns which ones are to be appended. The option allows the user to experiment with different append candidates to achieve the best results. In some cases, some of the append candidates (or portions of the append candidates) are appended automatically and presented to the user in a preview form, so that the user can inspect the results and make a final determination of which appends are accepted. Details for how to obtain the user specification are described in connection with FIG. 8 below.

At 408, the first data set and the second data set are appended according to (at least) the identified plurality of matching columns and the determined non-matching columns. The matching columns and the user specified columns are appended. The result table can be displayed to the user in a user interface display, saved to a storage location (e.g., a file or the like), output to another application, or a combination.

Figure 5:
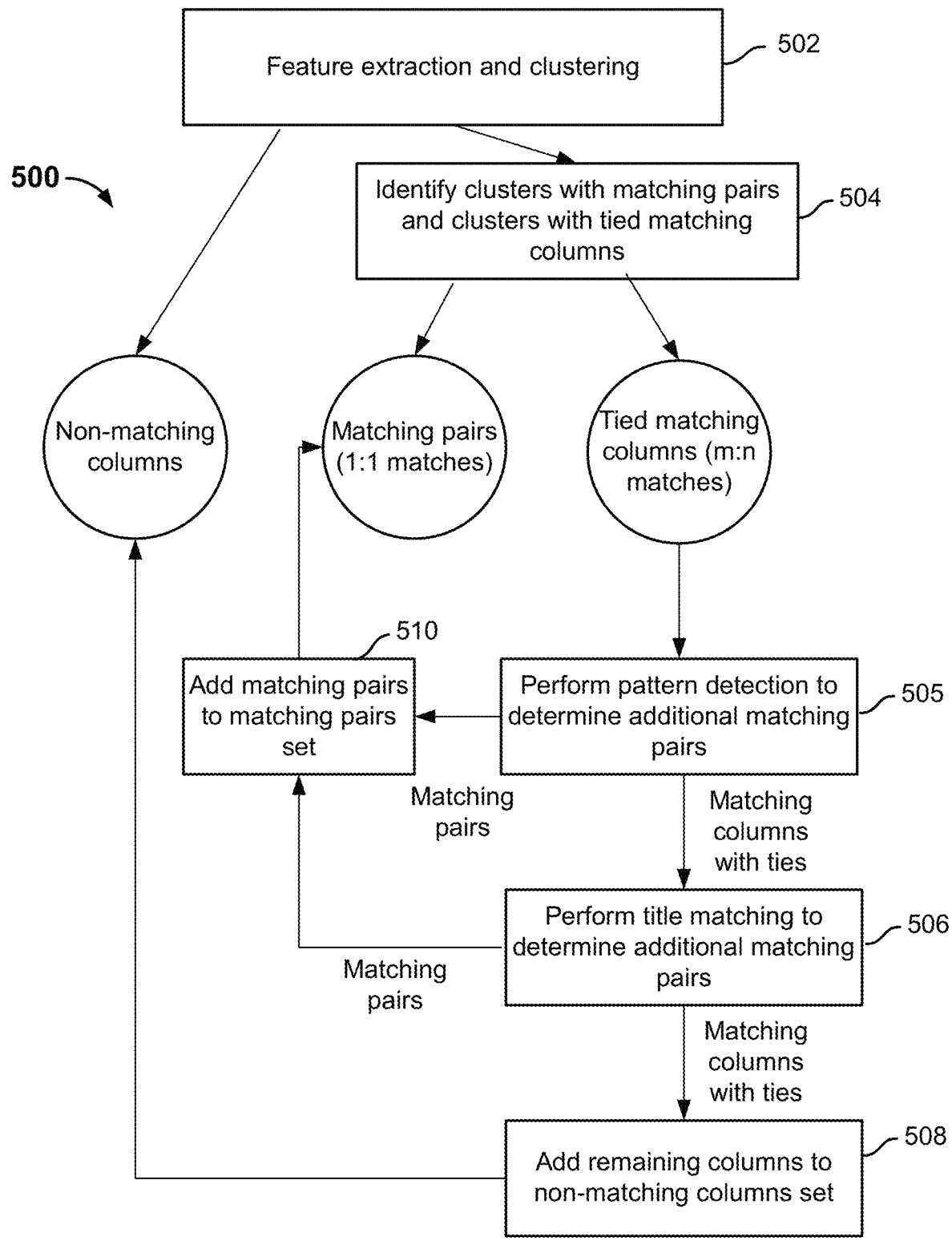
FIG. 5 is a flowchart illustrating an embodiment of a process for identifying the matching columns and the non-matching columns based on data contents.

FIG. 5 is a flowchart illustrating an embodiment of a process for identifying the matching columns and the non-matching columns based on data contents. Process 500 can be used to implement 404 of process 400. Process 500 employs a hierarchical approach to identifying matches that is both more efficient and more flexible than existing approaches.

At 502, feature extraction and clustering based at least in part on the contents of the first table and the second table are performed.

In some embodiments, feature extraction is performed on the contents of cells in each column. Some examples of features being extracted include: the number of spaces in the cells of the column, the number of punctuations in the cells of the column, the average length of values in the cells of the column, the variance of cell values in the column, the total number of words in cells of the column, the average number of words in cells of the column, and the number of symbol type transitions in cells of the column. Examples of symbol types include punctuation, letter, number classes, etc. For instance, the cell value of "123-abc-def" includes four symbol type transitions). Any other appropriate content-based features can be specified. In some embodiments, N features (N being an integer greater than 1) are specified automatically by the system or manually by a user. The features are extracted for each column, normalized, and clustered in an N-dimensional space.

Figure 6:
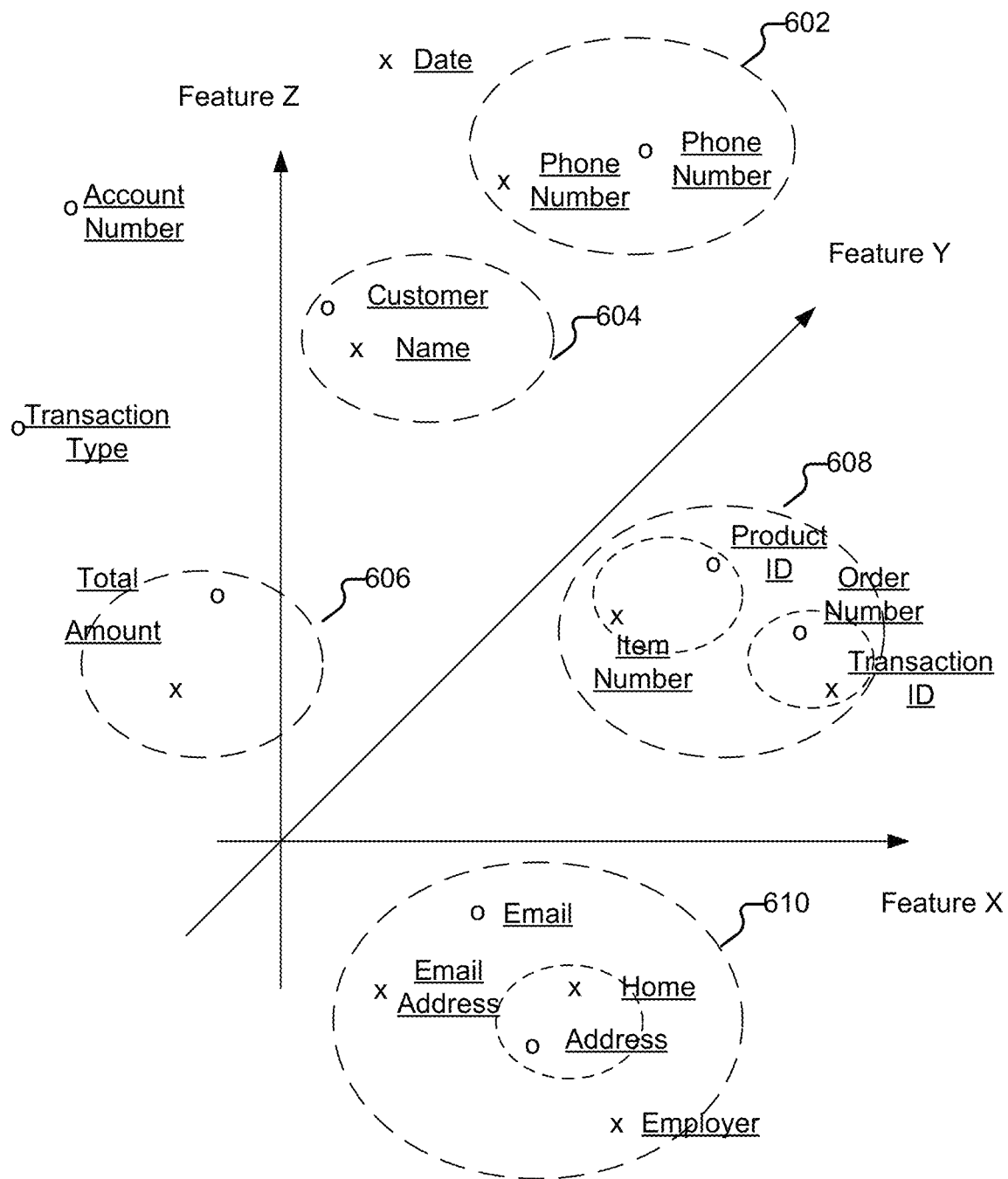
FIG. 6 is a diagram illustrating an example feature space representing the contents of the columns.

FIG. 6 is a diagram illustrating an example feature space representing the contents of the columns. For purposes of example, N is set to 3, thus a 3-dimensional space is shown. Other values of N can be used. The features can be any three of the above mentioned features or other appropriate features. The features of each column are extracted, normalized, and represented as a point in the 3-dimensional space. Each point is labeled with its corresponding column title. The points are clustered by applying to them a clustering technique such as K-means, fuzzy C-means, hierarchical clustering, mixture of Gaussians, or any other appropriate clustering technique. For example, in some embodiments, K-means clustering is implemented as software code (e.g., a library function) based on known algorithms such as Lloyd's algorithm or Swap algorithm. The vectors and the K value are input into the function call, which outputs approximately K clusters. In some embodiments, K is optionally configurable. For example, setting K to be the number of columns in the data set with the most columns reduces the possibility of clusters with ties (such as clusters including multiple columns from the first table and multiple columns from the second table), and setting K to a smaller value has the opposite effect. In FIG. 6, K is set to 5 and the resulting clusters are shown in dashes. In particular, "Date," "Account Number," and "Transaction Type" are not grouped into clusters and thus regarded as non-matching columns. The clusters each include two or more points representing two or more columns.

For a cluster, its corresponding columns are said to have matching content. Returning to FIG. 5, at 504, clusters with matching pairs (also referred to as clusters without ties) are identified. A matching pair is formed when a column in the first table is found to match a column in the second table. In some embodiments, a matching pair can also be formed when a combination of columns in the first table is found to match a column in the second table, a column in the first table is found to match a combination of columns in the second table, or a combination of columns in the first table is found to match a combination of columns in the second table. These matching pairs form appends that can be automatically performed. Referring again to FIG. 6, clusters 602, 604, and 606 are clusters with matching pairs. Specifically, "Phone Number" of the first table matches "Phone Number" of the second table, thus when the two tables are to be appended automatically, the cells in the "Phone Number" column of the second table are added after the "Phone Number" column of the first table. Additionally, "Name" of the first table matches "Customer" of the second table, and "Total" of the first table matches "Amount" of the second table. The remaining clusters (e.g., clusters 608 and 610) are identified as clusters with tied matching columns, also referred to as tied clusters or clusters with m:n matches, where m and n are integers, and at least one of m and n is greater than 1. The m:n matches indicate that multiple columns from one data set can each independently (that is, not in combination with other columns) match at least one column from the other data set, therefore the match between the columns is not 1:1. The clusters with tied matching columns are further processed to identify additional matching pairs.

Returning to FIG. 5, at 506, a first matching operation is performed on the clusters with the tied matching columns in an attempt to break ties and identify additional clusters with matching pairs (or equivalently, additional matching pairs).

The newly found clusters with matching pairs are added to the set of clusters with matching pairs.

In this example, the first matching operation includes pattern matching, which detects matching patterns based on the contents of the columns. In some embodiments, a pattern matching technique such as the TOPEI technique is used. The implementation of the TOPEI technique is available publicly. In some embodiments, TOPEI is implemented as software code (e.g., a library function) that takes a set of values as its input, and outputs a pattern based on the values. In the following example, # represents a numeral and * represents a character, and #? represents a string of numerals and *? represents a string of characters. Referring to the example shown in FIGS. 1 and 6, for cluster 608, the application of the TOPEI function on the contents of columns entitled "Order Number" and "Product ID" of Table 1 results in patterns of *####### (a letter followed by seven numerals) and ###### (six numerals), respectively. The application of the TOPEI function on the contents of columns entitled "Transaction ID" and "Item Number" of Table 2 also results in patterns of *####### (a letter followed by seven numerals) and ###### (six numerals), respectively. Thus, "Order Number" matches "Transaction ID," and "Product ID" matches "Item Number." The matching pairs form their own clusters. As another example, in cluster 610, the application of TOPEI to "Address" and "Email" of Table 1 results in patterns of #/*?##### (numerals and/or character string followed by five numerals) and */#?@* (numerals and/or character string followed by the '@' sign followed by character string), respectively. The application of TOPEI to "Home," "Employer," and "Email Address" results in patterns of #/*?##### (numerals and/or character string followed by five numerals), *? (character string) or 'N/A,' and *?'at'*?'dot'*? (character string followed by 'at' followed by character string followed by 'dot' followed by character string). Thus, "Address" and "Home" form a new matching pair of columns, but "Employer," "Email Address," and "Email" remain as unmatched columns.

In some cases, for a set of input data (e.g., a column of data) comprising multiple entries, the entries are input into a TOPEI function one by one, and TOPEI outputs patterns that are progressively more general to cover more entries. For instance, suppose values "U123," "U125," and "U195" are input into the TOPEI function in succession, the corresponding outputs will be patterns "U123," "U12 #" (U12 followed by one number) and "U1 ##" (U1 followed by two numbers), respectively. In some embodiments, to select a pattern among the plurality of possible patterns, the corresponding number or percentage of input entries that match each pattern is compared to a predefined threshold. The least general/most specific pattern that meets the threshold is selected. Other metrics can be used to facilitate the pattern selection in other embodiments, such as the number or percentage of unique values that match the pattern, the distribution of values that match the pattern (e.g., measured based on the distribution constant), etc. In some embodiments, the input is preprocessed. For example, one or more sentinel values that appear at a high frequency and signify a specific meaning (e.g., "N/A," etc.) are identified and the patterns are specified based on remaining values. In some embodiments, the number of entries in a column is large and performing pattern matching on each entry would be computationally expensive; thus, a representative sample is taken (e.g., 1% of the entries, etc.) and the pattern matching is performed on the sample.

In some embodiments, the pattern matching operation optionally examines patterns of combinations of columns in the data sets to identify matches. Thus, the matching pairs identified by the pattern matching operation can include multiple columns from one data set. For example, suppose that in the first data set there is a column, "Full Name," which stores full names of people, and in the second data set there are two columns, "First Name" and "Last Name." If the pattern matching operation indicates that the pattern of the "Full Name" column matches the pattern formed by the "First Name" column combined with the "Last Name" column, then the "Full Name" column of the first data set and the combination of "First Name" and "Last Name" columns in the second data set form a matching pair. In this case, when two columns are combined, the corresponding cells from the same row are added to form a new cell (e.g., "Bob" from the "First Name" column and "Smith" from the "Last Name" column are added to form a new result "Bob Smith").

Returning to FIG. 5, the matching pairs found at 505 are added to the set of matching pairs at 510. The remaining cluster(s) with tied matching columns are further processed.

At 506, title matching is performed on the remaining cluster(s) with tied matching columns in an attempt to identify additional matching pairs. Continuing with the example of FIG. 6, "Email" and "Email Address" are found to have matching titles. In this case, the titles do not need to match exactly for there to be a match; a partial match of the titles is sufficient to qualify the columns as a matching pair. In other embodiments, an exact match can be required. This newly found matching pair is added to the set of definitive appends at 510. The remaining column ("Employer") is treated as a non-matching column and added to the set of non-matching columns at 508. Thus, at the end of the process, the set of non-matching columns includes "Account Number" and "Transaction Type" of Table 1, and "Date" and "Employer" of Table 2. In some embodiments, when an append operation is ready to be performed, the matching pairs are automatically appended, and the non-matching columns are presented to the user to make appropriate selections. In some embodiments, the user is given user interface tools to make changes, such as breaking apart matching pairs. The user can make a change because a wrong matching pair has been detected, or because there is a different preference by the user. In such embodiments, the matching pairs are presented to the user, and will be appended during the operation if the user does not change the matching pairs. If the user makes changes to the matching pairs, those matching pairs that remain after the changes are appended. The user may interact with a user interface component to select and specify certain non-matching columns to form pairs to be appended.

FIG. 7 illustrates two example tables that are to be appended.

Figure 8:
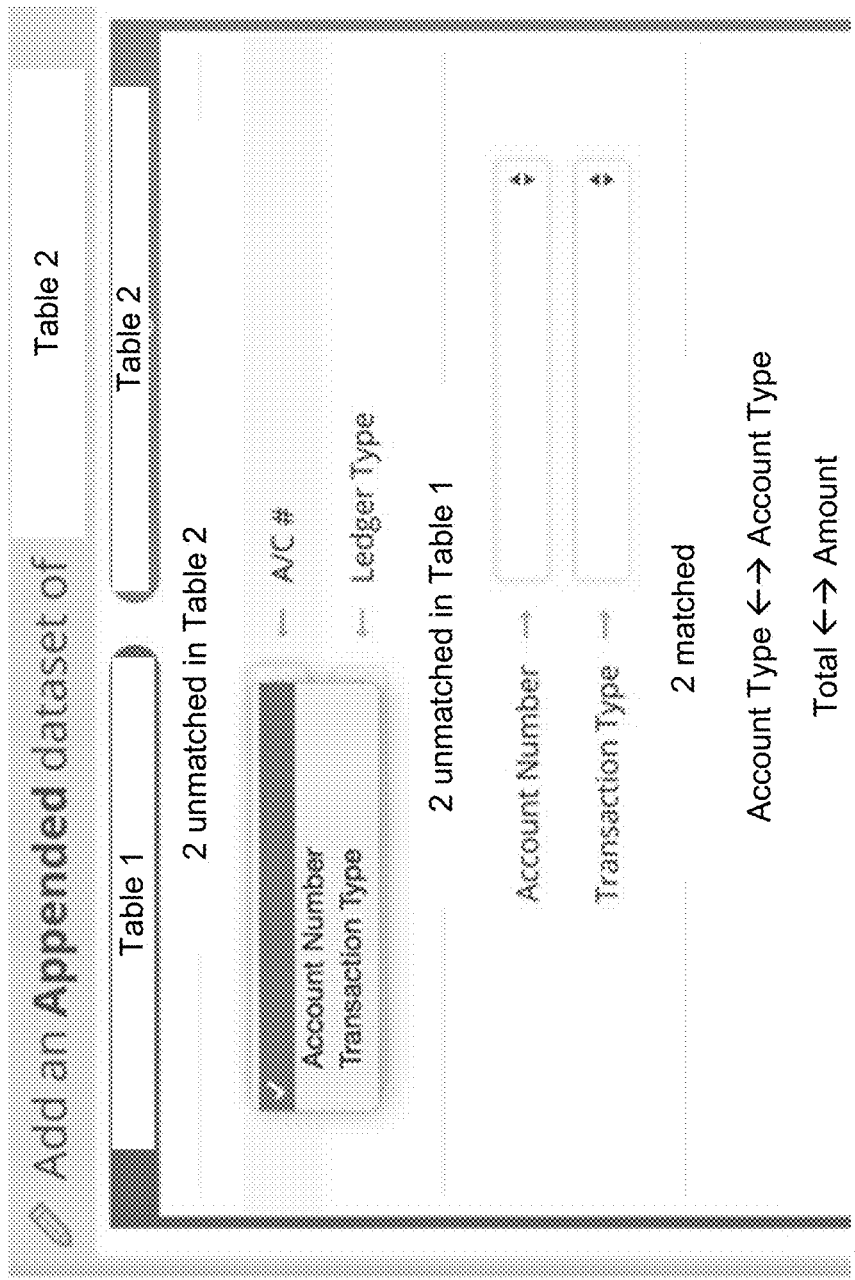
FIG. 8 is a screenshot illustrating an embodiment of a user interface screen for presenting the definitive appends and the candidate appends to the user.

FIG. 8 is a screenshot illustrating an embodiment of a user interface screen for presenting the definitive appends and the candidate appends to the user. In this example, the dataset of Table 1 is to be appended to the dataset of Table 2. After an append identification process such as 500 is performed, 2 pairs of matching columns are found. In this case, the "Account Type" column of Table 1 and the "Account Type" column of Table 2 form a matching pair, and the "Total" column of Table 1 and the "Amount" column of Table 2 form another matching pair. These matches are listed. Further, the unmatched columns of Table 1 are presented as candidates for append operations to an unmatched column of Table 2. The user may select a specific unmatched column from the list of unmatched columns of one table to be appended to another unmatched column of another table. The remaining columns are presented as potential candidates for matching with the remaining unmatched columns. For example, initially, "Account Number" and "Transaction Type" columns of Table 1 are shown as a list of candidates to be appended to "A/C #" column of Table 2. In some embodiments, when a selection is made, the remaining choices are dynamically updated. For example, suppose the user selects "Account Number" column of Table 1 to be appended with "A/C #" column of Table 2, then for the remaining column of Table 2, only "Transaction Type" column of Table 1 is presented as an append candidate for "Ledger Type" column of Table 2.

FIG. 9 illustrates an example result of an append operation using the tables of FIG. 7. It is assumed that the user has selected "Account Number" column of Table 1 and "A/C #" column of Table 2 to be a matching pair, and "Transaction Type" column of Table 1 and "Ledger Type" column of Table 2 to be a matching pair. In the example shown, the resulting table is compact and columns from the original tables are matched either automatically or by user selection.

Figure 10:
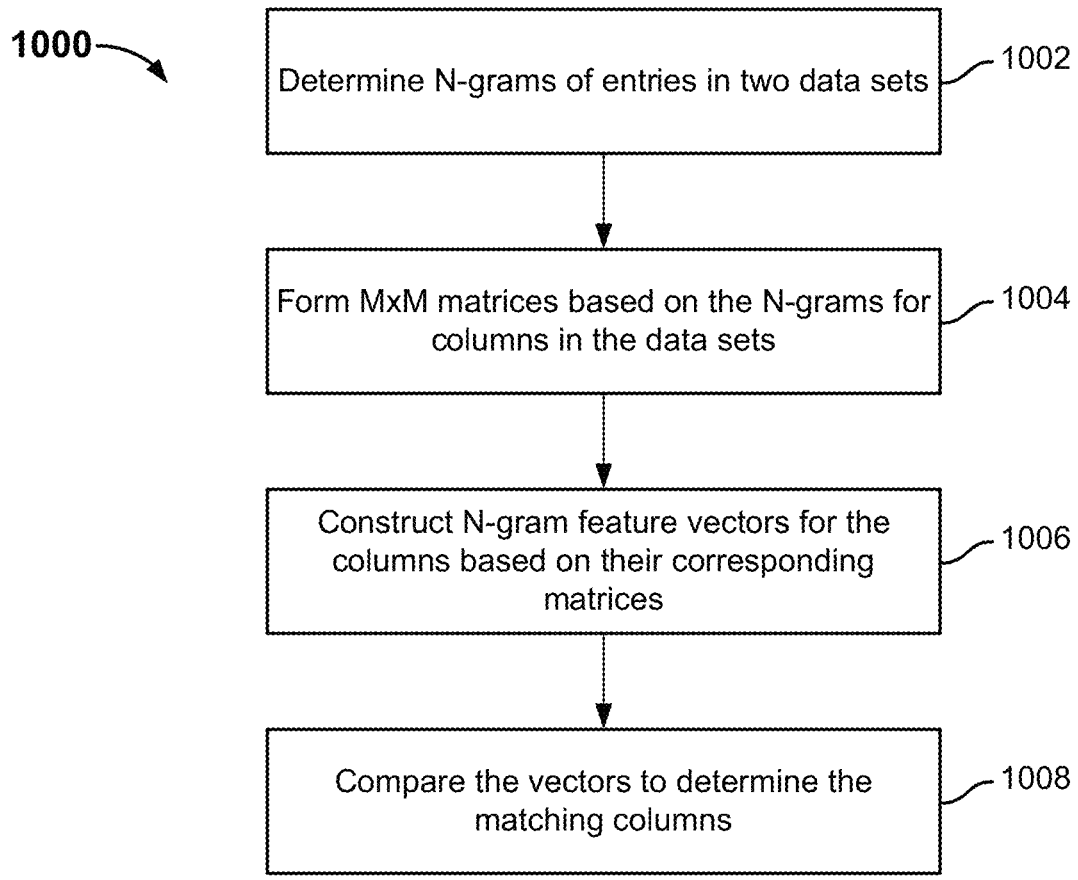
FIG. 10 is a flowchart illustrating another embodiment of a process for identifying matching columns based on data contents.

FIG. 10 is a flowchart illustrating another embodiment of a process for identifying matching columns based on data contents. Specifically, N-gram feature vectors are used in this process. Process 1000 can be used to implement 404 of process 400 as well as 505 of process 500.

At 1002, N-grams of entries in two data sets are determined. As used herein, an N-gram refers to a sequence of N contiguous items (e.g., letters or numbers) in an entry. For example, suppose that N is 2, then the entry of "debit" has N-grams of "de", "eb", "bi", and "it"; and the entry of "checking" has N-grams of "ch", "he", "ec", "ck", "ki", "in", and "ng". Suppose that N is 3, then "debit" has N-grams of "deb", "ebi", and "bit"; and the entry of "checking" has N-grams of "che", "hec", "eck", "cki", "kin", and "ing". Although N of 2 is discussed in the examples below, other N values can be used. Referring to the example in FIG. 7, for Table 1, the entry of "45674" has N-grams of "45", "56", "67", and "74." The N-grams of other entries in Tables 1 and 2 are similarly determined.

At 1004, for columns in the data set, M×M matrices are formed based on the corresponding N-grams.

In some embodiments, M corresponds to the number of possible symbols in the entries. In this example, the possible symbols are in American Standard Code for Information Interchange (ASCII). 128 commonly used ASCII characters are used to denote the indexes of the rows and columns, forming a 128×128 matrix. FIG. 11 is a diagram illustrating an example matrix. Entries in the matrix are initialized to zero. The N-grams of entries in a column are used to locate corresponding entries in the matrix. Specifically, the first and second ASCII characters in an N-gram are used to locate the row and column, respectively, and the value of the entry is incremented. For example, for the N-gram "de", the corresponding entry at row 100 ("d") and column 101 ("e") of the matrix is located and incremented; for the N-gram "eb", the corresponding entry at row 101 ("e") and column 98 ("b") of the matrix is located and its value incremented, and so on. The N-grams for entries in the column are located in their respective locations and the corresponding values in the matrix are incremented.

In some embodiments, M corresponds to the number of groups of possible symbols in the entries. For example, rather than letting a single row or column of the matrix correspond to a single ASCII value, a row or column of the matrix corresponds to a group of ASCII values. The grouping has the effect of compressing the matrix. For example, index 32 corresponds to symbols "", "a", and "b"; index 33 corresponds to symbols "c", "d", and "e"; etc. Other groupings are possible. The resulting matrix is more compact (e.g., a 43×43 matrix), and therefore saves memory and improves computation time. FIG. 12 is a diagram illustrating an example of a compressed matrix.

At 1006, N-gram feature vectors are constructed for the columns based on their corresponding matrices. For a single column, the rows of the corresponding matrix are concatenated to form a vector. In the case of an M×M matrix (e.g., 43×43), the vector is a 1×M$^2$ (e.g., 1×1849) vector. An N-gram feature vector is used to represent a corresponding column in the data set.

At 1008, the vectors are compared to determine the matching columns.

In some embodiments, similarities of the vectors are computed and used to determine which columns are matching columns. Specifically, cosine similarities of pairs of N-gram feature vectors are computed based on the N-gram feature vectors. If two columns are similar, the angle between their N-gram feature vectors will be small. The more they are alike, the smaller the angle. If the two columns are the same, the two N-gram feature vectors will be the same, and the angle between them is zero. Thus, the greater the cosine similarity value, the greater the similarity of the two corresponding vectors. For two vectors A and B, where A=[A$_0$, A$_1$, . . . , A$_i$, . . . , A$_k$] and B=[B$_0$, B$_1$, . . . , B$_i$, . . . , B$_k$], and k=M$^2$, the cosine similarity is computed according to the following formula:

$$\text{cosine similarity}(A, B) = \frac{AB}{\|A\|\|B\|} = \frac{\sum_{i=0}^{k-1} A_i B_i}{\sqrt{\sum_{i=0}^{k-1} A_i^2} \sqrt{\sum_{i=0}^{k-1} B_i^2}}$$

In some embodiments, a comprehensive approach is used to identify candidate columns. In particular, the cosine similarities of possible combinations of N-gram feature vectors between two data sets are computed. In other words, for a first data set comprising columns 0, 1, 2 and corresponding N-gram vectors V$_0$, V$_1$, and V$_2$, and a second data set comprising columns 3, 4, 5 and corresponding N-gram vectors V'$_3$, V'$_4$, and V'$_5$, the cosine similarities of (V$_0$, V'$_3$), (V$_0$, V'$_4$), (V$_0$, V'$_5$), (V$_1$, V'$_3$), (V$_1$, V'$_4$), (V$_1$, V'$_5$), (V$_2$, V'$_3$), (V$_2$, V'$_4$), and (V$_2$, V'$_5$) are computed and ranked. The top ranking pairs (or the pairs that exceed a similarity threshold) are determined to correspond to candidate columns that can be appended. Optionally, N-gram feature vectors of combinations of multiple columns are additionally compared. For example, the cosine similarities of (V$_0$, V'$_3$+V'$_4$), (V$_0$, V'$_3$+V'$_5$), (V$_0$, V'$_4$+V'$_5$), (V$_0$+V$_1$, V'$_3$+V'$_4$), etc. can be computed, and the values can be used to determine which columns from each data set should be appended.

To compute cosine similarities of all possible combinations of N-gram feature vectors can require a significant amount of computational cycles, especially when the number of columns is large. Thus, in some embodiments, a "greedy approach" is used to identify the matching columns. In this approach, a vector corresponding to a column in the first data set is compared with vectors corresponding to columns in the second data set based on the respective cosine similarities, and the column in the second data set that results in the greatest cosine similarity value is selected as the matching column for the column in the first data set. Once a column from the second data set has been matched, it is removed from the list and prevented from future matches. For example, suppose that for V$_0$ of the first data set, the corresponding N-gram feature vectors ranked according to descending order of cosine similarity values are V'$_4$, V'$_3$, and V'$_5$, then the matching columns are V$_0$ and V'$_4$. Next, for V$_1$ of the first data set, the ranked N-gram feature vectors are V'$_5$ and V'$_3$ (V'$_4$ is no longer available since it has already been matched with V$_0$). Those pairs with cosine similarity values exceeding a threshold are selected as append column candidates.

In some embodiments, a projection approach is used to identify the matching columns. In most cases, this approach is less computationally intensive than the comprehensive approach and more accurate than the greedy approach. The N-gram feature vectors are projected in a vector space, normalized, and compared to identify matching columns. The dimensionality of the vector space is equal to the width of the N-gram feature vectors. In the case of a 1×M$^2$ feature vector, the dimensionality of the vector space is M$^2$. The direction of an N-gram feature vector in this vector space is determined by how often each possible N-gram appears in the original data. Columns with similar data would have corresponding projected N-gram feature vectors that are close to each other in the vector space.

Figure 13:
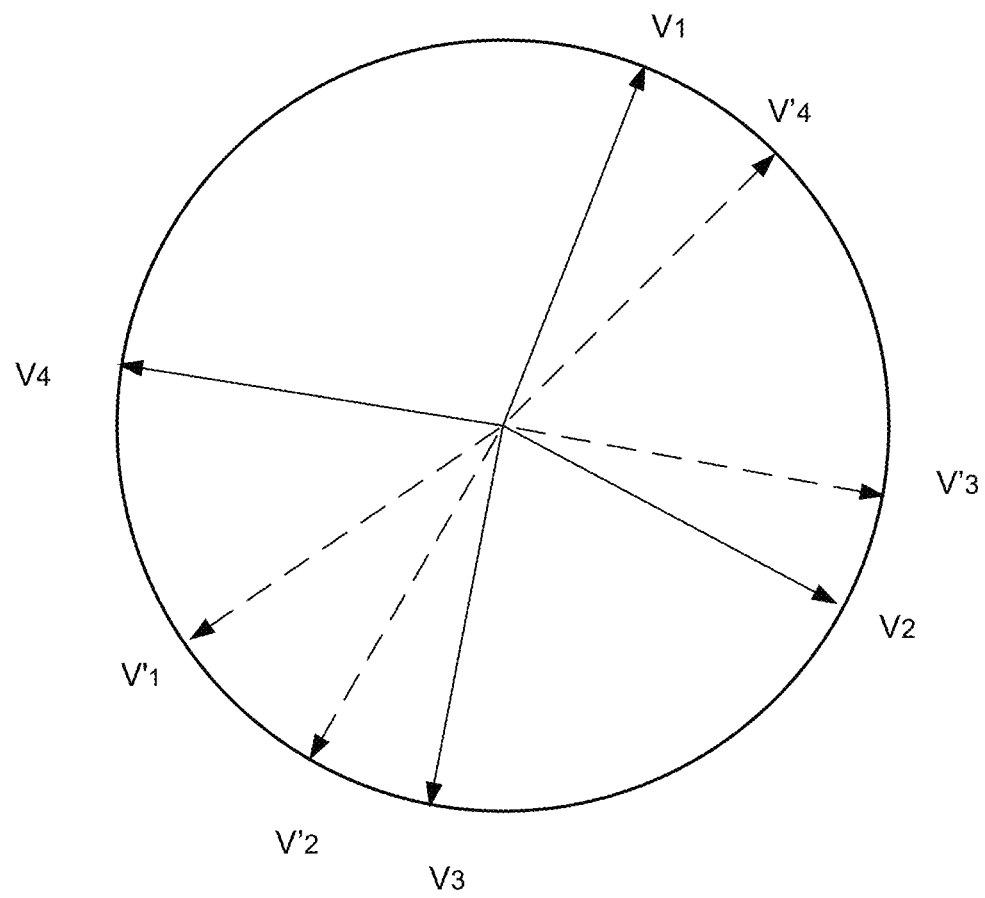
FIG. 13 is a diagram illustrating an embodiment of a projection circle used to identify the matching columns.

FIG. 13 is a diagram illustrating an example of a projection technique for identifying the matching columns. Since a vector space with dimensionality greater than 3 is difficult to render, simple projections of vectors on a 2-dimensional circle are shown for purposes of illustration. Pairs of closest vectors can be determined by inspection. In this example, V$_1$ and V'$_4$, V$_2$ and V'$_3$, V$_3$ and V'$_2$, and V$_4$ and V'$_1$ form the closest pairs. Columns in a closest pair are deemed to be matching columns. In some embodiments, the similarity (e.g., as represented using cosine similarity, angular distance, Euclidean distance, or any other appropriate similarity measurement) between a pair of vectors is compared with a threshold, and the pair of vectors are only deemed to be append candidates if the similarity exceeds the threshold.

Append detection for data preparation has been disclosed. A hierarchical approach for identifying matching and non-matching columns is used. The set of computations, such as clustering the columns, performing pattern detection, and performing title matching, are performed on progressively smaller subsets of tied matching columns and therefore highly efficient and scalable. The ability to automatically append matching pairs without requiring prior user knowledge about the data improves how the data is processed and used. The ability for the user to select non-matching columns to form matches offers greater flexibility in terms of how the append operations may be performed. The result of the data prepared using the technique can be used in many other applications such as database applications, data warehouse applications, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
    identifying, based at least in part on contents of a first data set comprising a first plurality of columns and contents of a second data set comprising a second plurality of columns;

a plurality of matching columns comprising:
  one or more columns among the first plurality of columns; and
  corresponding one or more matching columns among the second plurality of columns, wherein the one or more columns among the first plurality of columns and the corresponding one or more matching columns among the second plurality of columns have at least some matching content,
  wherein identifying the plurality of matching columns comprises performing a clustering technique on an extracted plurality of features of cells in the first plurality of columns of the first data set and an extracted plurality of features of cells in the second plurality of columns of the second data set; and
a plurality of non-matching columns comprising:
  one or more columns among the first plurality of columns, that are included in the first data set and that do not match with any columns among the second plurality of columns; and
  one or more columns among the second plurality of columns, that are included in the second data set and that do not match with any columns among the first plurality of columns;
obtaining a specification of:
  a selection of a first column among non-matching columns of the first data set to be appended to a second column among non-matching columns of the second data set, a selection of a first column among non-matching columns of the second data set to be appended to a second column among non-matching columns of the first data set, or both;
  a change to the plurality of matching columns; or both; and
appending at least a portion of the first data set and at least a portion of the second data set according to the plurality of matching columns and the specification, including:
  appending at least some of the first one or more non-matching columns with at least some of the second one or more non-matching columns;
  appending matching columns that are not subject to the change to the plurality of matching columns; or both.

2. The method of claim 1, wherein the identification of the plurality of matching columns and the plurality of non-matching columns includes:
  extracting the plurality of features of cells in the first plurality of columns of the first data set and extracting the plurality of features of cells in the second plurality of columns of the second data set.

3. The method of claim 1, wherein performing the clustering technique includes performing a K-means based clustering technique.

4. The method of claim 1, wherein the identification of the plurality of matching columns and the plurality of non-matching columns further includes identifying one or more clusters with matching pairs, and one or more clusters with tied matching columns in which multiple columns from the first or the second data set independently match at least one column from the other data set.

5. The method of claim 4, further comprising performing a pattern matching operation on the one or more clusters with the tied matching columns to identify one or more additional clusters with matching pairs.

6. The method of claim 5, wherein the pattern matching operation is implemented as a TOPEI-based pattern matching operation.

7. The method of claim 5, further comprising performing a title matching operation on one or more remaining clusters with the tied matching columns to identify one or more additional clusters with untied matching columns.

8. The method of claim 2, wherein the features that are extracted for a column include one or more of: number of spaces in cells of the column, number of punctuations in the cells of the column, average length of values in the cells of the column, variance of values in the cells of the column, total number of words in the cells of the column, average number of words in the cells of the column, and/or number of symbol type transitions in the cells of the column.

9. The method of claim 1, further comprising outputting the plurality of non-matching columns to be displayed.

10. The method of claim 1, further comprising causing a selection interface to be provided to a user, and the selection interface being configured for the user to: select the first column among non-matching columns of the first data set to be appended to the second column among non-matching columns of the second data set, select the first column among non-matching columns of the second data set to be appended to the second column among non-matching columns of the first data set, or both.

11. The method of claim 1, wherein the plurality of matching columns are identified based at least in part on a plurality of N-gram feature vectors.

12. The method of claim 1, further comprising:
  determining N-grams of entries in the first data set and in the second data set;
  forming a plurality of matrices based at least in part on the N-grams of the entries in the first data set and in the second data set;
  determining, based at least in part on the plurality of matrices, a first plurality of N-gram feature vectors corresponding to the first plurality of columns and a second plurality of N-gram feature vectors corresponding to the second plurality of columns; and
  comparing one or more vectors in the first plurality of N-gram feature vectors with one or more vectors in the second plurality of N-gram feature vectors to determine the matching columns.

13. The method of claim 12, wherein the comparing of the one or more vectors in the first plurality of N-gram feature vectors with the one or more vectors in the second plurality of N-gram feature vectors to determine the matching columns includes computing cosine similarities.

14. The method of claim 12, wherein the comparing of the one or more vectors in the first plurality of N-gram feature vectors with the one or more vectors in the second plurality of N-gram feature vectors includes projecting the one or more vectors in the first plurality of N-gram feature vectors and the one or more vectors in the second plurality of N-gram feature vectors in a vector space.

15. The method of claim 1, wherein the identification of the plurality of matching columns and the plurality of non-matching columns further includes identifying among clustering results one or more columns that are not grouped into any clusters as non-matching columns.

16. The method of claim 2, wherein:
  N features are extracted, N being an integer greater than 2; and
  the clustering is performed in an N-dimensional space.

17. A system, comprising:
one or more processors configured to:
- identify, based at least in part on contents of a first data set comprising a first plurality of columns and contents of a second data set comprising a second plurality of columns:
  - a plurality of matching columns comprising:
    - one or more columns among the first plurality of columns; and
    - corresponding one or more matching columns among the second plurality of columns, wherein the one or more columns among the first plurality of columns and the corresponding one or more matching columns among the second plurality of columns have at least some matching content,
    - wherein to identify the plurality of matching columns includes to perform a clustering technique on an extracted plurality of features of cells in the first plurality of columns of the first data set and an extracted plurality of features of cells in the second plurality of columns of the second data set; and
  - a plurality of non-matching columns comprising:
    - one or more columns among the first plurality of columns, that are included in the first data set and that do not match with any columns among the second plurality of columns; and
    - one or more columns among the second plurality of columns, that are included in the second data set and that do not match with any columns among the first plurality of columns;
- obtain a specification of:
  - a selection of a first column among non-matching columns of the first data set to be appended to a second column among non-matching columns of the second data set, a selection of a first column among non-matching columns of the second data set to be appended to a second column among non-matching columns of the first data set, or both;
  - a change to the plurality of matching columns; or both; and
- append at least a portion of the first data set and at least a portion of the second data set according to the plurality of matching columns and the specification, including to:
  - append at least some of the first one or more non-matching columns with at least some of the second one or more non-matching columns;
  - append matching columns that are not subject to the change to the plurality of matching columns; or both; and
- one or more memories coupled to the one or more processors and configured to provide the one or more processors with instructions.

18. The system of claim 17, wherein to identify the plurality of matching columns and the plurality of non-matching columns includes to:
extract the plurality of features of cells in the first plurality of columns of the first data set and extract the plurality of features of cells in the second plurality of columns of the second data set.

19. The system of claim 17, wherein to perform the clustering technique includes to perform a K-means based clustering technique.

20. The system of claim 17, wherein to identify the plurality of matching columns and the plurality of non-matching columns further includes to identify one or more clusters with matching pairs, and one or more clusters with tied matching columns in which multiple columns from the first or the second data set independently match at least one column from the other data set.

21. The system of claim 20, wherein the one or more processors are further configured to perform a pattern matching operation on the one or more clusters with the tied matching columns to identify one or more additional clusters with matching pairs.

22. The system of claim 21, wherein the pattern matching operation is implemented as a TOPEI-based pattern matching operation.

23. The system of claim 21, wherein the one or more processors are further configured to perform a title matching operation on one or more remaining clusters with the tied matching columns to identify one or more additional clusters with untied matching columns.

24. The system of claim 18, wherein the features that are extracted for a column include one or more of: number of spaces in cells of the column, number of punctuations in the cells of the column, average length of values in the cells of the column, variance of values in the cells of the column, total number of words in the cells of the column, average number of words in the cells of the column, and/or number of symbol type transitions in the cells of the column.

25. The system of claim 17, wherein the one or more processors are further configured to cause the plurality of non-matching columns to be presented to a user.

26. The system of claim 17, wherein the one or more processors are further configured to cause a selection interface to be provided for a user, and the selection interface being configured for the user to: select the first column among non-matching columns of the first data set to be appended to the second column among non-matching columns of the second data set, select the first column among non-matching columns of the second data set to be appended to the second column among non-matching columns of the first data set, or both.

27. The system of claim 17, wherein the plurality of matching columns are determined based on a plurality of N-gram text feature vectors.

28. The system of claim 17, wherein the one or more processors are further configured to:
determine N-grams of entries in the first data set and in the second data set;
form a plurality of matrices based at least in part on the N-grams of the entries in the first data set and in the second data set;
determine, based at least in part on the plurality of matrices, a first plurality of N-gram feature vectors corresponding to the first plurality of columns and a second plurality of N-gram feature vectors corresponding to the second plurality of columns; and
compare one or more vectors in the first plurality of N-gram feature vectors with one or more vectors in the second plurality of N-gram feature vectors to determine the matching columns.

29. The system of claim 28, wherein to compare the one or more vectors in the first plurality of N-gram feature vectors with the one or more vectors in the second plurality of N-gram feature vectors to determine the matching columns includes to compute cosine similarities.

30. The system of claim 28, wherein to compare the one or more vectors in the first plurality of N-gram feature vectors with the one or more vectors in the second plurality of N-gram feature vectors includes to project the one or more vectors in the first plurality of N-gram feature vectors and the one or more vectors in the second plurality of N-gram feature vectors in a vector space.

31. The system of claim 17, wherein the identification of the plurality of matching columns and the plurality of non-matching columns further includes identifying among clustering results one or more columns that are not grouped into any clusters as non-matching columns.

32. The system of claim 17, wherein:
N features are extracted, N being an integer greater than 2; and
the clustering is performed in an N-dimensional space.

33. A computer program product embodied in a tangible non-transitory computer readable storage medium and comprising computer instructions for:
identifying, based at least in part on contents of a first data set comprising a first plurality of columns and contents of a second data set comprising a second plurality of columns:
a plurality of matching columns comprising:
one or more columns among the first plurality of columns; and
corresponding one or more matching columns among the second plurality of columns, wherein the one or more columns among the first plurality of columns and the corresponding one or more matching columns among the second plurality of columns have at least some matching content,
wherein identifying the plurality of matching columns comprises performing a clustering technique on an extracted plurality of features of cells in the first plurality of columns of the first data set and an extracted plurality of features of cells in the second plurality of columns of the second data set; and
a plurality of non-matching columns comprising:
one or more columns among the first plurality of columns, that are included in the first data set and that do not match with any columns among the second plurality of columns; and
one or more columns among the second plurality of columns, that are included in the second data set and that do not match with any columns among the first plurality of columns;
obtaining a specification of:
a selection of a first column among non-matching columns of the first data set to be appended to a second column among non-matching columns of the second data set, a selection of a first column among non-matching columns of the second data set to be appended to a second column among non-matching columns of the first data set, or both;
a change to the plurality of matching columns; or both; and
appending at least a portion of the first data set and at least a portion of the second data set according to the plurality of matching columns and the specification, including:
appending at least some of the first one or more non-matching columns with at least some of the second one or more non-matching columns;
appending matching columns that are not subject to the change to the plurality of matching columns; or both.

* * * * *